US007277733B2

(12) United States Patent
Ko et al.

(10) Patent No.: US 7,277,733 B2
(45) Date of Patent: Oct. 2, 2007

(54) SYSTEM AND METHOD FOR PROVIDING WEB CONTENT PROVISION SERVICE USING SUBSCRIBER TERMINAL IN EXCHANGE SYSTEM

(75) Inventors: Chae-Ho Ko, Seoul (KR); Jun-Young Kwon, Kunpo-shi (KR); Ji-Sook Kim, Suwon-shi (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1021 days.

(21) Appl. No.: 10/294,749

(22) Filed: Nov. 15, 2002

(65) Prior Publication Data

US 2003/0091016 A1 May 15, 2003

(30) Foreign Application Priority Data

Nov. 15, 2001 (KR) ................ 2001-70916

(51) Int. Cl.
| | |
|---|---|
| H04M 1/00 | (2006.01) |
| H04M 1/66 | (2006.01) |
| H04B 1/38 | (2006.01) |
| H04L 29/08 | (2006.01) |
| H04L 12/28 | (2006.01) |
| H04Q 2/20 | (2006.01) |
| H04Q 7/00 | (2006.01) |
| G06F 15/16 | (2006.01) |

(52) U.S. Cl. ............... 455/566; 455/550.1; 455/556.2; 455/414.4; 455/554.1; 455/411; 455/462; 709/219; 370/328; 370/338; 370/395.52; 370/395.53

(58) Field of Classification Search .. 455/414.1–414.4, 455/555, 566, 550.1, 552.1, 553.1, 556.1–556.2, 455/557–559, 560–561, 554.1, 554.2, 403, 455/415, 433, 465–466, 432.1, 551, 517, 455/524, 432.2, 432.3, 410–411, 41.2; 370/395.5–395.53, 370/327–328, 335–338, 340, 349, 356, 352–353, 370/313, 389, 396, 398; 709/228–229, 218–219, 709/202–203, 249; 379/196–199, 224–234, 379/900, 88.25, 242, 245

See application file for complete search history.

(56) References Cited

U.S. PATENT DOCUMENTS

| | | | |
|---|---|---|---|
| 5,550,906 A * | 8/1996 | Chau et al. ............. | 379/201.05 |
| 5,905,776 A * | 5/1999 | Shaffer ................... | 379/88.22 |
| 6,335,928 B1 | 1/2002 | Herrmann et al. | |
| 6,339,593 B1 | 1/2002 | Kikinis | |
| 6,393,014 B1 | 5/2002 | Daly et al. | |
| 6,400,817 B1 * | 6/2002 | Su et al. ................ | 379/201.05 |
| 6,404,762 B1 | 6/2002 | Luzeski et al. | |
| 6,411,615 B1 | 6/2002 | DeGoia, Jr. et al. | |
| 6,529,453 B1 * | 3/2003 | Otsuka et al. .......... | 369/30.32 |
| 6,618,476 B1 * | 9/2003 | Szeto et al. ................ | 379/198 |
| 7,050,989 B1 * | 5/2006 | Hurt et al. ................... | 705/14 |
| 7,120,135 B2 * | 10/2006 | Kim ......................... | 370/329 |
| 2002/0067732 A1 * | 6/2002 | Roy ........................... | 370/401 |
| 2002/0069261 A1 * | 6/2002 | Bellare et al. ............. | 709/218 |
| 2002/0120684 A1 * | 8/2002 | Christfort et al. .......... | 709/203 |
| 2002/0120779 A1 * | 8/2002 | Teeple et al. .............. | 709/246 |
| 2004/0054973 A1 * | 3/2004 | Yamamoto .................. | 715/530 |

OTHER PUBLICATIONS

Bur Goode, "*Voice Over Internet Protocol (VoIP)*", IEEE. vol. 90, No. 9, pp. 1495-1517, Sep. 2002.

* cited by examiner

*Primary Examiner*—Meless Zewdu
(74) *Attorney, Agent, or Firm*—Robert E. Bushnell, Esq.

(57) ABSTRACT

System and method for providing a Web content provision service using a subscriber terminal in an exchange system. The Web content provision service system comprises the subscriber terminal generating content request information containing user information in response to a content request, receiving content information according to the content request information, and displaying the received content information on a display, a Web server for collecting the content information from at least one predetermined Web site at intervals of a certain time, storing the collected content information, accessing the stored content information in response to a message requesting transmission of the content information and sending the accessed content information to the subscriber terminal, and the exchange system having identification information corresponding to the subscriber terminal and port information corresponding to the identification information, being connected to an Internet protocol (IP) network via a local area network (LAN) and being connected to a public switched telephone network (PSTN) via a trunk card, sending the content transmission request message to the Web server over the Internet protocol network in response to the content request information from the subscriber terminal, receiving the content information according to the content request information from the Web server, and sending the received content information to the subscriber terminal.

21 Claims, 4 Drawing Sheets

SYSTEM AND METHOD FOR PROVIDING WEB CONTENT PROVISION SERVICE USING SUBSCRIBER TERMINAL IN EXCHANGE SYSTEM

CLAIM OF PRIORITY

This application makes reference to, incorporates the same herein, and claims all benefits accruing under 35 U.S.C. §119 from our application SYSTEM AND METHOD FOR PROVIDING WEB CONTENT PROVISION SERVICE USING SUBSCRIBER TERMINAL IN EXCHANGE SYSTEM filed with the Korean Industrial Property Office on Nov. 15, 2001 and there duly assigned Serial No. 2001-70916.

BACKGROUND OF THE INVENTION

1. Technical Field

The present invention relates to an apparatus and method for providing a web content provision service using a subscriber terminal in an exchange system which is configured to be capable of controlling an Internet protocol (IP) terminal like a legacy terminal by receiving user information from the Internet protocol terminal.

2. Related Art

Due to information communication industry development, the Internet has rapidly become popular and there have been requests for various Internet services. As a result, Internet protocol (IP) networks have been remarkably developed in performance and service aspects and requests for more various services have continuously come to the front of a market. Further, it has been required for a private branch exchange (PBX) centered around voice communications to provide additional services for data communications. There has arisen a movement to provide additional customized Web contents as well as a voice through an extension terminal of the private branch exchange (PBX), such as a digital phone, to meet the above requests.

In order to obtain desired Web contents from a Web site connected to an Internet protocol (IP) network, a user can gain access to the Web site via a transmission control protocol/internet protocol (TCP/IP) socket using his/her computer system capable of local area network (LAN) communications, and access the desired Web contents using a Web browser installed in the computer system, as well known to those skilled in the art. However, the computer system is a digital data transmission device rather than an extension subscriber terminal for voice communications. Therefore, it is impossible to be provided with Web contents without a terminal device such as the computer system.

As a result, because a user cannot be provided with desired Web contents from a Web server using his/her subscriber terminal for voice communications, accommodated in an exchange system, the user must use a local area network card and computer to obtain the desired Web contents from the Web server.

I have found that receiving Web content or Internet information using a telephone can be inconvenient or difficult to accomplish. Efforts have been made to implement improvements related to a communication among telephones and the World Wide Web or Internet.

Exemplars of recent efforts in the art include U.S. Pat. No. 6,335,928 to Herrmann et al., entitled METHOD AND APPARATUS FOR ACCESSING AND INTERACTING AN INTERNET WEB PAGE USING A TELECOMMUNICATIONS DEVICE, issued on Jan. 1, 2002, U.S. Pat. No. 6,404,762 to Luzeski et al., entitled UNIVERSAL MESSAGING SYSTEM PROVIDING INTEGRATED VOICE, DATA AND FAX MESSAGING SERVICES TO PC/WEB-BASED CLIENTS, INCLUDING A SESSION MANAGER FOR MAINTAINING A SESSION BETWEEN A MESSAGING PLATFORM AND THE WEB-BASED CLIENTS, issued on Jun. 11, 2002, U.S. Pat. No. 6,411,615 to DeGoia Jr et al., entitled EMBEDDED WEB PHONE MODULE, issued on Jun. 25, 2002, U.S. Pat. No. 6,393,014 to Daly et al., entitled METHOD AND SYSTEM FOR PROVIDING DATA COMMUNICATION WITH A MOBILE STATION, issued on May 21, 2002, and U.S. Pat. No. 6,339,593 to Kikinis, entitled NETWORK TELEPHONE INTERFACE SYSTEMS BETWEEN DATA NETWORK TELEPHONY AND PLAIN OLD TELEPHONE SERVICE INCLUDING CTI ENHANCEMENT IN THE DATA NETWORK, issued on Jan. 15, 2002.

While these recent efforts provide advantages, I note that they fail to adequately provide a system and method for providing Web content provision service using subscriber terminal in exchange system.

SUMMARY OF THE INVENTION

Therefore, the present invention has been made in view of the above problems, and it is an object of the present invention to provide Web content provision service system and method which allow a user to be provided with Web contents of at least one Web site connected to an Internet protocol network using a subscriber terminal connected to a private branch exchange (PBX) based on an Internet protocol or local area network.

It is another object of the present invention to provide a Web content provision service system and method which allow a user to be provided with Web contents of at least one Web site connected to an Internet protocol network using a digital telephone connected to a private branch exchange (PBX) based on an Internet protocol or local area network.

It is yet another object of the present invention to provide a Web content provision service system and method which allow a user to be provided with Web contents of at least one Web site connected to an Internet protocol network using an Internet protocol phone connected to a private branch exchange (PBX) based on an Internet protocol or local area network.

In accordance with the present invention, the above and other objects can be accomplished by the provision of a system for providing a Web content provision service using at least one subscriber terminal of an exchange system, the system comprising the subscriber terminal generating content request information containing user information in response to a content request, receiving content information according to the content request information, and displaying the received content information on a display; a Web server for collecting the content information from at least one predetermined Web site at intervals of a certain time, storing the collected content information, accessing the stored content information in response to a message requesting transmission of the content information, and sending the accessed content information to the subscriber terminal; and the exchange system having identification information corresponding to the subscriber terminal and port information corresponding to the identification information, being connected to an Internet protocol (IP) network via a local area network (LAN) and being connected to a public switched telephone network (PSTN) via a trunk card, and sending the content transmission request message to the Web server over the Internet protocol network in response to the content request information from the subscriber terminal, receiving the content information according to the content request information from the Web server and sending the received content information to the subscriber terminal.

Preferably, the user information may include a unique telephone number or a unique port number of the subscriber terminal and be contained in the content information outputted from the Web server such that the exchange system usefully uses the user information to send the content information to the subscriber terminal.

Preferably, the subscriber terminal may be a digital telephone which is registered in the exchange system as an extension subscriber under the condition that it is connected to a digital subscriber module of the exchange system, or be an Internet protocol phone which can be provided with a call control service under the condition that it is connected to the Internet protocol network via the local area network in a similar manner an extension subscriber of the exchange system.

Preferably, the Web content provision service system may further comprise a telephone application program interface driver which receives the content transmission request message from the exchange system, converts the received content transmission request message into an American National Standard Code for Information Interchange (ASCII) code message of a hypertext markup language (HTML) format, sends the converted ASCII code message to the Web server, receives the content information sent from the Web server in response to the content transmission request message, converts the received content information into a computer and telephony integration (CTI) message and sends the converted CTI message to the exchange system.

With this construction, the Web content provision service system allows a user to directly access desired Web contents stored in the Web server connected to the Internet protocol network using the digital telephone which is a legacy phone or the Internet protocol phone, which is accommodated in the exchange system based on an Internet protocol.

To achieve these and other objects in accordance with the principles of the present invention, as embodied and broadly described, the present invention provides an apparatus providing a Web content provision service using at least one subscriber terminal of an exchange system, the apparatus comprising: at least one subscriber terminal generating content request information in response to a content request, receiving content information in response to the generating of the content request information, and displaying the received content information on a display, the content request information containing information identifying a user; a Web server collecting the content information from at least one predetermined Web site at predetermined intervals of time, storing the collected content information, accessing the stored content information in response to a first message requesting transmission of the content information, and sending the accessed content information to said at least one subscriber terminal, the first message corresponding to the content request information; and an exchange system having identification information corresponding to said at least one subscriber terminal, having port information corresponding to the identification information, being connected to an Internet protocol network through a local area network, being connected to a public switched telephone network through a trunk card, and sending the first message to said Web server over the Internet protocol network in response to the content request information received from said at least one subscriber terminal, receiving the accessed content information from said Web server, and sending the received content information to said at least one subscriber terminal.

To achieve these and other objects in accordance with the principles of the present invention, as embodied and broadly described, the present invention provides an apparatus, comprising: at least one wireless terminal generating content request information containing user information in response to a content request, receiving content information according to the content request information, and displaying the received content information on a display; a Web server collecting the content information from at least one predetermined World Wide Web site at intervals of a certain time, storing the collected content information, accessing the stored content information in response to a first request message requesting to transmit the stored content information, and sending the accessed content information to said at least one wireless terminal, the first request message being in response to the generated content request information; an exchange system having identification information corresponding to said at least one wireless terminal and having port information corresponding to the identification information, said exchange system being connected to an Internet protocol network through a local area network, said exchange system sending the first request message to said Web server over the Internet protocol network in response to the content request information inputted through a trunk card, receiving the content information according to the content request information from the Web server, and outputting the received content information through the trunk card; and an infomobile system establishing traffic channels between said at least one wireless terminal and a plurality of other wireless terminals, receiving the content request information from said at least one wireless terminal, sending the received content request information to said exchange system through the trunk card, receiving the content information from said exchange system, and sending the received content information to said at least one wireless terminal.

To achieve these and other objects in accordance with the principles of the present invention, as embodied and broadly described, the present invention provides a method of providing a Web content delivery service, comprising: providing a Web content delivery service with at least one subscriber terminal of a Web content delivery service apparatus, the apparatus including at least one digital telephone and an exchange system and a Web server and a telephone application program interface (TAPI) driver, the at least one digital telephone being in communication with a subscriber module and generating content request information in response to a content request, the content request information containing user information including at least a port number of the digital telephone, the exchange system being connected to an Internet protocol network through a local area network, the exchange system providing a call control service to the at least one digital telephone using the user information, the Web server being connected to the exchange system through the local area network, the Web server sending the content information in response to a first request message requesting transmission of the content information, the first request message corresponding to the generated content request information, the driver being connected to the exchange system and to the Web server through the local area network, the driver converting messages to be exchanged between the exchange system and the Web server, and the driver conveying the converted messages between the exchange system and the Web server, the Web content delivery service comprising: sending the first request message to the Web server through the driver in response to the content request information received from the at least one digital telephone; sending the content information from the Web server in response to the first request message; receiving the content information from the Web server through the driver; and sending the received content information to the at least one digital telephone.

To achieve these and other objects in accordance with the principles of the present invention, as embodied and broadly described, the present invention provides a method of providing a Web content provision service, comprising: providing a Web content provision service with at least one subscriber terminal of a Web content provision service apparatus, the apparatus including at least one Internet protocol telephone and an exchange system and a Web server and a telephone application program interface (TAPI) driver, the at least one Internet protocol telephone being connected to an Internet protocol network through a local area network, the Internet protocol telephone generating content request information containing user information in response to a content request, the exchange system being connected to the Internet protocol network and the Internet protocol telephone through a local area network, the exchange system providing a call control service to the Internet protocol telephone using the user information including a port number of the Internet protocol telephone, the Web server being connected to the exchange system through the local area network, the Web server sending content information in response to a first request message, the first request message requesting transmission of the content information, the first request message corresponding to the generated content request information, the driver being connected to the exchange system and to the Web server through the local area network, the driver converting messages exchanged between the exchange system and the Web server, the driver transmitting the converted messages between the exchange system and the Web server, the Web content provision service comprising: sending the first request message to the Web server through the driver in response to the content request information received from the Internet protocol telephone; sending the content information from the Web server in response to the first request message; receiving the content information from the Web server through the driver; and sending the received content information received from the Web server to the Internet protocol telephone.

To achieve these and other objects in accordance with the principles of the present invention, as embodied and broadly described, the present invention provides a method for providing a Web content provision service, comprising: providing a Web content provision service using at least one subscriber terminal of a Web content provision service apparatus, the apparatus including at least one wireless terminal and an exchange system and an infomobile system and a Web server, the at least one wireless terminal generating content request information containing user information in response to a content request, the at least one wireless terminal receiving content information according to the content request information, the at least one wireless terminal displaying the received content information on a display, the exchange system having identification information of the at least one wireless terminal and port information corresponding to the identification information, the exchange system being connected to an Internet protocol network through a local area network, the exchange system sending a content transmission request message to the Web server over the Internet protocol network in response to the content request information inputted through a trunk card, the exchange system receiving the content information according to the content transmission request message from the Web server and outputting the received content information through the trunk card, the infomobile system establishing traffic channels between the at least one wireless terminal and at least one other wireless terminal, the infomobile receiving the content request information from the at least one wireless terminal, the infomobile sending the received content request information to the exchange system through the trunk card of the exchange system, the infomobile receiving the content information from the exchange system and sending the received content information to the at least one wireless terminal, the Web content provision service comprising: sending the content transmission request message to the Web server through a telephone application program interface (TAPI) driver in response to the content request information received from the at least one wireless terminal through the infomobile system; allowing the Web server to send the content information in response to the content transmission request message; receiving the content information from the Web server through the driver; and sending the received content information to the at least one wireless terminal through the infomobile system, further comprising: allowing the Web server to collect the content information from at least one predetermined Web site according to a preset program; and allowing the Web server to store the collected content information in an internal storage area of the Web serve, further comprising: allowing the Web server to divide the stored content information by a predetermined size in response to the content transmission request message; and allowing the Web server to send the divided content information to the exchange system through the driver.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENTS

While the present invention will be described more filly hereinafter with reference to the accompanying drawings, in which preferred embodiments of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Illustrative embodiments of the invention are described below. In the interest of clarity, not all features of an actual implementation are described. In the following description, well-known functions, constructions, and configurations are not described in detail since they could obscure the invention with unnecessary detail. It will be appreciated that in the development of any actual embodiment numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

Figure 1:
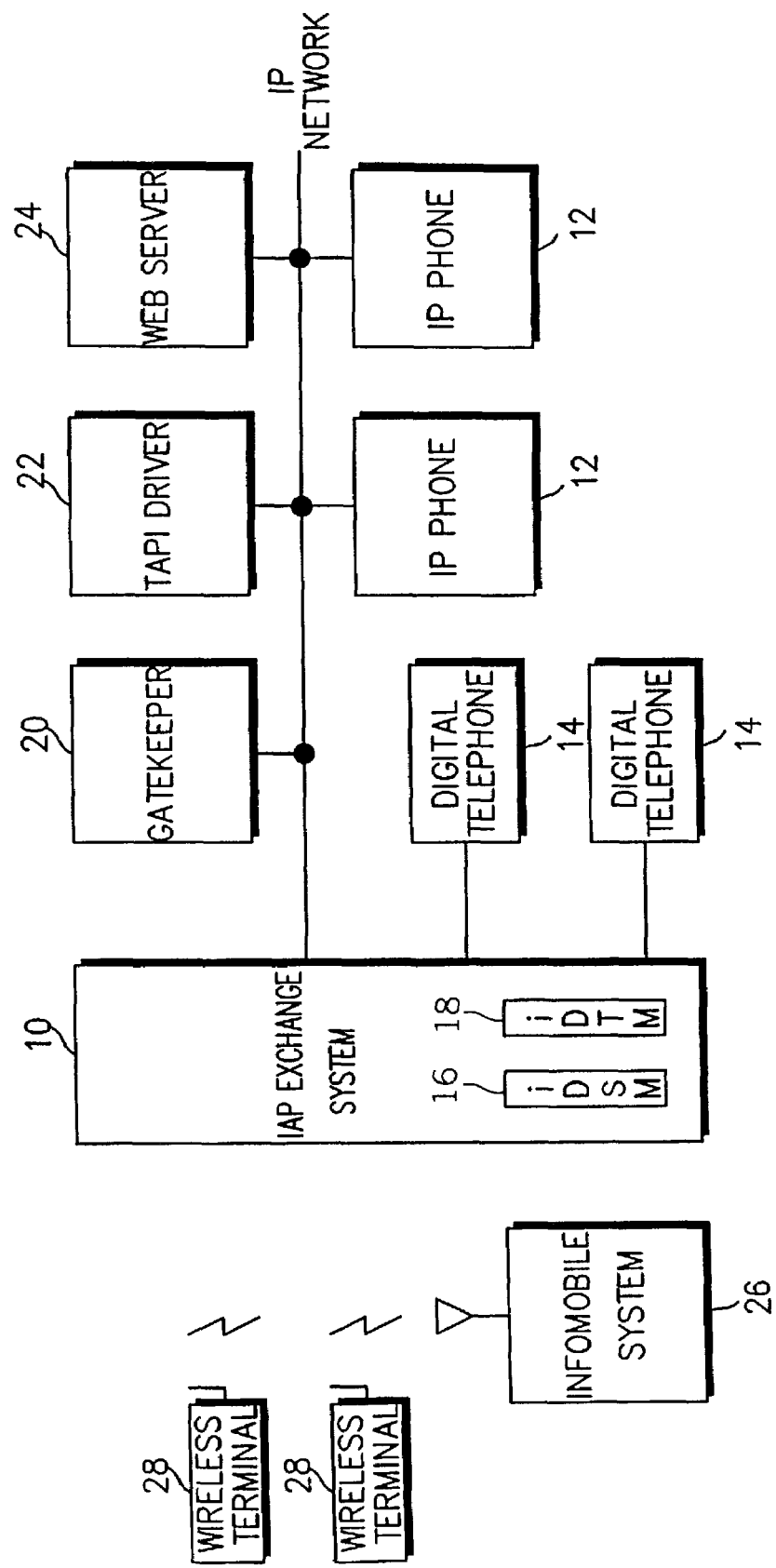
FIG. 1 is a block diagram showing the construction of a system for providing a Web content provision service using a subscriber terminal of an exchange system, in accordance with the principles of the present invention.

With reference to FIG. 1, there is shown in block form the construction of a Web content provision service system in accordance with the present invention. As shown in this drawing, reference numeral 10 denotes an integrated access platform (IAP) exchange system which is an IP-based private branch exchange (PBX). Generally, the IP-based private branch exchange (PBX) can provide extension telephone services to a number of Internet protocol phones connected thereto through a local area network by integrating the Internet protocol phones similarly to legacy terminals, or extension subscribers. The integrated access platform (IAP) exchange system 10 includes a digital subscriber module (iDSM) 16 for interfacing a digital telephone 14 thereto and a digital trunk module (iDTM) 18 for inputting a transit call from the outside to perform a call control service. The Web content provision service can be referred to as a Web content delivery service because it delivers content from the World Wide Web such as current news and other information.

Although not shown in FIG. 1, the integrated access platform (IAP) exchange system 10 is also connected to a public switched telephone network (PSTN) like a general private branch exchange (PBX) through a central office trunk card to execute a call control service by performing an interaction with the PSTN. The integrated access platform (IAP) exchange system 10 constructed as mentioned above has a connection through a local area network to a gatekeeper 20 connected to an Internet protocol network. Further, the integrated access platform (IAP) exchange system 10 has connections through the local area network to a telephone application program interface (TAPI) driver 22 for converting a computer and telephony integration (CTI) message into a message of a hypertext markup language (HTML) format or vice versa, and to a Web server 24 for collecting and storing content information. The Web server 24 functions to collect the content information to be provided to a user from a number of Web sites connected to the Internet protocol network and store the collected content information in its internal mass memory according to a program preset therein. In FIG. 1, the reference numeral 26 denotes an infomobile system connected to the digital trunk module (iDTM) 18 of the integrated access platform (IAP) exchange system 10.

The infomobile system 26 can perform functions of both a private base station and private base station controller. Further, the infomobile system 26 functions to establish traffic channels between a wireless terminal 28 and other ones. Furthermore, the infomobile system 26 performs a signaling process to establish a speech path between the wireless terminal 28 and an extension subscriber such as the digital telephone 14 or an Internet protocol (IP) phone 12 accommodated in the integrated access platform (IAP) exchange system 10, and sends user information to the IAP exchange system 10. Correspondingly, the integrated access platform (IAP) exchange system 10 performs the same call control service as that provided to the extension subscriber using a database of information about a user of the wireless terminal 28, such as a number assignment module (NAM) code, telephone number, extension port number or so forth. The infomobile system 26 is the same as one now under manufacture and sale by, for example, Samsung Electronics Co., Ltd. The digital telephone 14 may be, for example, a Samsung digital phone manufactured and sold by Samsung Electronics Co., Ltd. As the Internet protocol (IP) phone 12, a Samsung Web phone or IP phone manufactured by Samsung Electronics Co., Ltd. may be used.

In FIG. 1, operations and processes related to the control operations regarding calls between the integrated access platform (IAP) exchange system 10 and the Internet protocol (IP) phone 12, between the IP phone 12 and other ones, between the IP phone 12 and a legacy phone, or the digital telephone 14, and from the legacy phone or IP phone to the Internet protocol (IP) network are described generally in U.S. Ser. No. 10/270,070 invented by Du-Yong Yang, et al., and filed on Oct. 15, 2002, entitled INTERNET PROTOCOL TELEPHONY EXCHANGE SYSTEM AND CALL CONTROL METHOD THEREOF. A description of the present invention will be generally directed to an operation concerned with a Web content provision service, and different operations may be better understood from U.S. Ser. No. 10/270,070.

Preferred embodiments of the present invention will be described on the basis of an example where the integrated access platform (IAP) exchange system 10 is used. However, it is noted that any private branch exchange (PBX) based on a local area network or Internet protocol can be applied to the present invention. For example, a private branch exchange (PBX) having a connection to at least one IP phone through the local area network can be applied to the present invention if it has call control information with which it can control the IP phone like an extension terminal using an identification (ID), or a telephone number, Internet protocol address, etc., which are used to identify the IP phone. The IP phone has a function of sending to a call control processor of the private branch exchange (PBX) user information such as identifier, Internet protocol information, hook on/off information, various key select information according to key selects or the like. Further, the IP phone needs to have an interface for displaying corresponding data thereon in response to display information, etc. sent from the private branch exchange (PBX).

Now, the preferred embodiments of the present invention will be described below with reference to FIGS. 1 to 4. Each of the preferred embodiments corresponds to a procedure of providing the content information through the integrated access platform (IAP) exchange system 10, telephone application program interface (TAPI) driver 22 and Web server 24 using at least one subscriber terminal such as the IP phone 12, digital telephone 14 or wireless terminal 28.

Web Content Provision Service Using Digital Telephone

Figure 2:
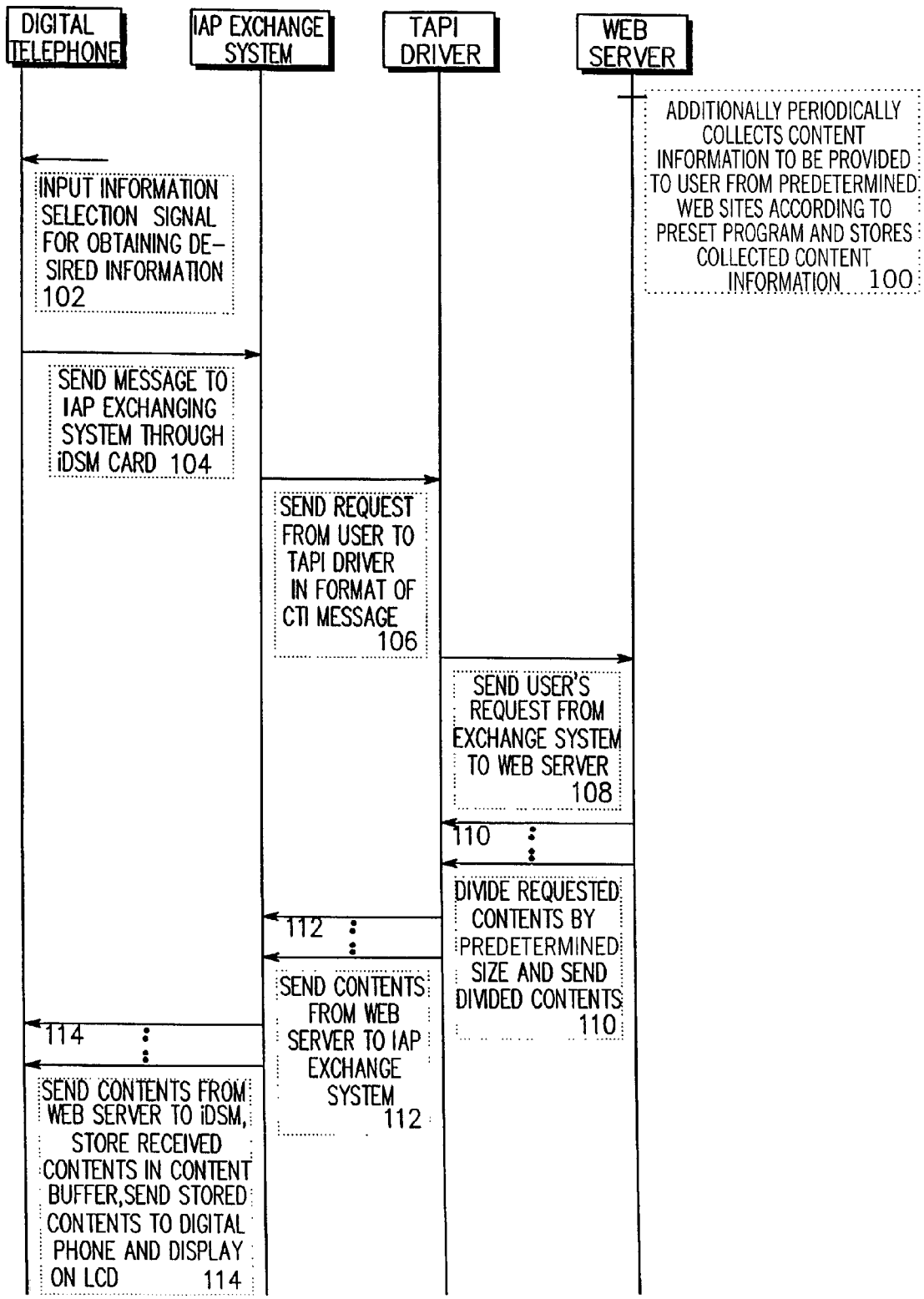
FIG. 2 is a sequence diagram illustrating a procedure of providing a Web content provision service using a digital telephone of the exchange system, in accordance with the principles of a first embodiment of the present invention.

First, when the Web content provision service providing system, as shown in FIG. 1, starts to operate, the Web server 24 collects content information to be provided to a user from a number of Web sites according to a program preset therein and stores the collected content information in its internal mass memory at step 100 of FIG. 2. Namely, at step 100, the Web server 24 refers to a plurality of programmed uniform resource locators (URLs) to collect useful content information such as weather information, news, stock information, lifestyle information, in-house business information, etc., from the different Web sites corresponding to the plurality of URLs at a predetermined time and stores the collected content information in the mass memory. The stored content information may be updated at predetermined periods or at regular intervals.

Under this condition, the user selectively enters to the digital telephone 14 an information select signal such as a content request signal for requesting desired information using keys on a keyboard (or keypad) of the digital telephone 14 in FIG. 1 at step 102 of FIG. 2. Then, at step 104, the digital telephone 14 sends content request information, or the entered content request signal, to a call processor, or the call control processor of the integrated access platform (TAP) exchange system 10 via the digital subscriber module (iDSM) 16 under the condition that the content request information has a header containing the above mentioned user information.

In other words, at step 102, a user makes a "content request" by entering a signal or a command into the digital telephone 14 in order to request some information from the World Wide Web. The information that the user is requesting shall be referred to as "content information" since it is content from the World Wide Web. In response to the user's content request, the digital phone 14 then generates "content request information" corresponding to the content information that has been requested by the user. Then, at step 104, the digital phone 14 transmits the "content request information" to the IAP exchange system 10 through the iDSM card 16. The content request information contains information identifying the user who made the content request or identifying the digital telephone 14.

The user information is a unique identification code assigned to the digital telephone 14, such as a port number, telephone number, or another identifier. On the basis of the user information contained in the content request information, the Web server 24 can be made aware of correct destination information to be added to a header of a content frame according to the content request signal, as will be described below.

At step 106, the call processor of the integrated access platform (IAP) exchange system 10 receives the content request information from the digital telephone 14, converts the received content request information into a content transmission request message of a computer and telephony integration (CTI) message format and sends the converted content transmission request message through the local area network to the telephone application program interface (TAPI) driver 22 connected to the Internet protocol network. The content transmission request message is sent to the TAPI driver 22 via the transmission control protocol/Internet protocol (TCP/IP) socket. It should be noted that the content transmission request message is sent under the condition that the user information is contained therein. At step 106, the CTI message sent from the IAP exchange system 10 to the TAPI driver 22 can be referred to as a "second CTI message." The "content transmission request message" can be referred to as a "first request message."

At step 108, the telephone application program interface (TAPI) driver 22 receives the content transmission request message of a computer and telephony integration (CTI) message format, converts the received content transmission request message into an American National Standard Code for Information Interchange (ASCII) code message of a hypertext markup language (HTML) format, and sends the converted ASCII code message to the Web server 24. In response to the American National Standard Code for Information Interchange (ASCII) code message from the TAPI driver 22, the Web server 24 accesses content information which is stored in the internal mass memory and matched with the user's desired information. Then, the Web server 24 checks a data size of the accessed content information to determine whether the data size of the accessed content information exceeds a predetermined data transmission length. If it is determined that the data size of the accessed content information exceeds the predetermined data transmission length, the Web server 24 divides the accessed content information by the predetermined data transmission length.

For example, in the case where the data size of the accessed content information exceeds 300 kilobytes (Kbytes), the Web server 24 divides the accessed content information by 300 Kilobytes and sends a message containing the divided content information to the telephone application program interface (TAPI) driver 22 at step 110. At this time, the message is sent from the Web server 24 to the TAPI driver 22 under the condition it has a hypertext markup language (HTML) format and has the user information in a header of a transmission frame thereof.

If the telephone application program interface (TAPI) driver 22 receives from the Web server 24 the message containing the content information which is divided by a constant length, or the predetermined data transmission length, then the TAPI driver 22 converts the received message into a computer and telephony integration (CTI) message. Then, the TAPI driver 22 sends the converted CTI message to the integrated access platform (IAP) exchange system 10 through the local area network at step 112. At step 112, the CTI message sent from the TAPI driver 22 to the IAP exchange system 10 can be referred to as a "first CTI message."

When the integrated access platform (IAP) exchange system 10 receives the CTI message from the TAPI driver 22, the call processor of the IAP exchange system 10 analyzes the user information contained in the header of the received CTI message and sends the received message to the digital telephone 14 through the digital subscriber module (iDSM) 16 on the basis of the user information at step 114. Further, at step 114, upon receiving the message from the integrated access platform (IAP) exchange system 10 through the digital subscriber module (iDSM) 16, the digital telephone 14 of the user stores the content information contained in the received message in its internal content buffer and displays the stored content information on its display. The display may preferably be an liquid crystal display (LCD) or thin film transistor liquid crystal display (TFT-LCD).

As described above, the user enters the content request signal using a digital telephone 14 in order to obtain desired content information. However, the present invention is not limited to this and the user can be provided with the content information in a simpler manner, preferably, a menu driven manner.

In more detail, if the user selects a specific key to be provided with content information using the digital telephone 14, then content request information according to the key select is sent to the Web server 24 in the same manner as the above procedure. Upon receiving the content request information, the Web server 24 outputs a list (or menu) of providable content information (for example: 1. weather, 2. traffic, 3. news, 4. lifestyle information, 5. stock information, 6. in-house business, etc.). The Web content list outputted from the Web server 24 is provided to the digital telephone 14 and displayed on the liquid crystal display (LCD) of the digital telephone 14 in the same manner as the above procedure. If the user selects a numeral key corresponding to an item number of desired Web content item of the list displayed on the liquid crystal display (LCD) of the digital telephone 14, corresponding key select information is sent to the Web server 24 in the same manner as the above steps 102, 104, 106 and 108 in FIG. 2. The Web server 24 outputs content information requested by the user upon receiving the key select information. Then, the content information from the Web server 24 are sent from the Web server 24 to the digital telephone 14 and displayed in the same manner as the above steps 110, 112 and 114 in FIG. 2.

As described above, the first embodiment of the present invention allows the user of the digital telephone 14 accommodated in the integrated access platform (IAP) exchange system 10 to be provided with customized Web contents by performing an interaction with the Web server 24, thereby increasing utilization of the digital telephone 14 which has been used as a voice communications dedicated terminal. Therefore, in the first embodiment, the user can easily surf the Web and obtain the desired Web contents without using his/her computer to access the Internet.

Web Content Provision Service Using Internet Protocol (IP) Phone

In a second embodiment of the present invention, a Web content provision service is provided using the IP phone 12 in a very similar manner to the first embodiment which provides the Web content provision service using the digital telephone 14 as described above. However, in the second embodiment, the IP phone 12 exchanges user datagram protocol (UDP) messages with the integrated access platform (IAP) exchange system 10, and data is transmitted over a different transmission path from that in the first embodiment. A detailed description of the second embodiment will be given below.

When the Web content provision service system, as shown in FIG. 1, starts to operate, the Web server 24 updates content information stored in its internal mass memory at step 200 in the same manner as the above step 100 of FIG. 2.

Figure 3:
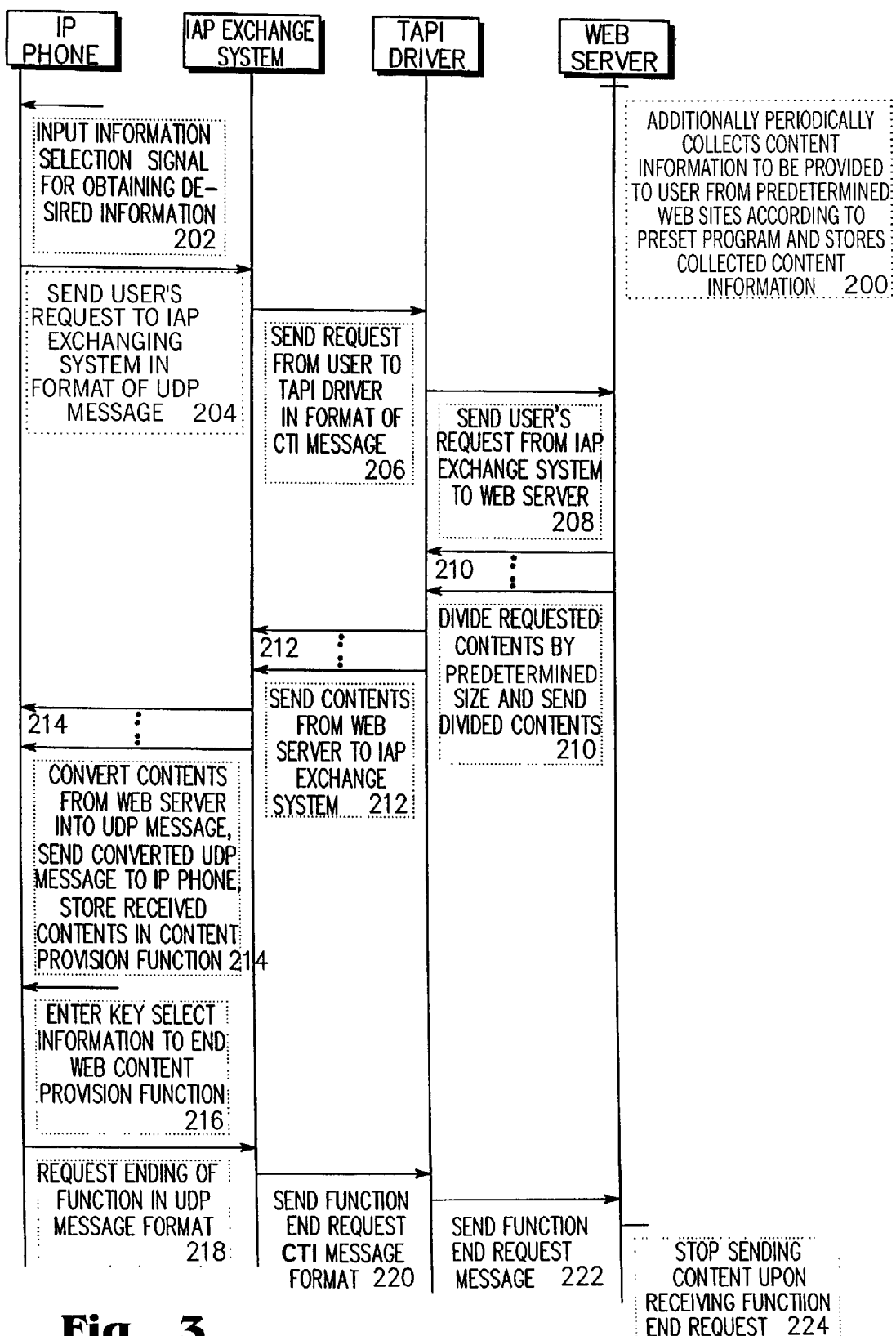
FIG. 3 is a sequence diagram illustrating a procedure of providing a Web content provision service using an Internet protocol (IP) phone of the exchange system, in accordance with the principles of a second embodiment of the present invention.

With reference to FIG. 3, a user of the IP phone 12 selectively enters to the IP phone 12 an information select signal such as a content request signal for requesting desired information, or desired content information, using keys on a keyboard (or keypad) of the IP phone 12 at step 202 of FIG. 3. Then, at step 204, the IP phone 12 converts content request information, or the entered content request signal, into a user datagram protocol (UDP) message and sends the converted UDP message to the integrated access platform (IAP) exchange system 10 via the local area network under the condition that the content request information has a header containing the user information mentioned in the first embodiment. It should be noted that the user datagram protocol (UDP) message is sent to the integrated access platform (IAP) exchange system 10 under the condition that the user information is contained therein.

Thereafter, if the integrated access platform (IAP) exchange system 10 receives the user datagram protocol (UDP) message, at step 206, it controls its call processor, or the call control processor to analyze the user information contained in the UDP message and, on the basis of the user information, recognize which IP phone has requested the desired content information among a number of IP phones. Further, at step 206, the call processor then converts the user datagram protocol (UDP) message into a content transmission request message of a computer and telephony integration (CTI) message format and sends the converted content transmission request message through the local area network to the telephone application program interface (TAPI) driver 22 connected to the Internet protocol network. The content transmission request message is sent to the TAPI driver 22 via the transmission control protocol/Internet protocol (TCP/IP) socket similarly to the manner described in the first embodiment. It should be noted that the content transmission request message is sent under the condition that the user information is contained therein.

If the sending of the content transmission request message to the telephone application program interface (TAPI) driver 22 is completed, the integrated access platform (IAP) exchange system 10, TAPI driver 22 and Web server 24 perform steps 208, 210 and 212 in FIG. 3, which steps are the same as the above steps 108, 110 and 112 in FIG. 2, and, as a result, content information according to the content transmission request message is sent to the IAP exchange system 10 in the form of a computer and telephony integration (CTI) message. Upon receiving the computer and telephony integration (CTI) message containing the content information from the Web server 24, the integrated access platform (IAP) exchange system 10 converts the received CTI message into a content message of a user datagram protocol (UDP) message format and sends the converted content message to the IP phone 12 corresponding to the user information contained in the CTI message at step 214 in FIG. 3. Further, at step 214, upon receiving the content message of the user datagram protocol (UDP) message format from the integrated access platform (IAP) exchange system 10, the IP phone 12 stores the content information contained in the received content message in its internal content buffer and displays the stored content information on its liquid crystal display (LCD).

After being provided with the content information through the IP phone 12, the user can enter specific key select information, or an end information command, to the IP phone 12 to end its Web content provision function at step 216. If the IP phone 12 inputs the end information command from the user, then the IP phone 12 converts the end information command into a function end request message of the user datagram protocol (UDP) message format and sends the converted function end request message to the integrated access platform (IAP) exchange system 10. Thereafter, the function end request message is sent to the Web server 24 through steps 218, 220, 222 and 224 in FIG. 3. In response to the function end request message, the Web server 24 stops sending the content information to the IP phone 12 corresponding the user information previously received therein.

As described above, the second embodiment of the present invention allows the user of the IP phone 12 accommodated in the integrated access platform (IAP) exchange system 10 as an extension subscriber to be provided with customized Web contents by performing an interaction with the Web server 24, thereby maximizing a utilization efficiency of the IP phone 12 which has been used as a voice communications dedicated terminal.

Web Content Provision Service Using Wireless Terminal

In a third embodiment of the present invention, a Web content provision service is provided using the wireless terminal 28 connected to the integrated access platform (IAP) exchange system 10 via the infomobile system 26 utilizing a wireless application protocol (WAP). An interaction between the wireless terminal 28, infomobile system 26 and the integrated access platform (IAP) exchange system 10 in FIG. 1 is established to accommodate the wireless terminal 28 in the IAP exchange system 10 as an extension subscriber to perform a call control service. The Web content provision service in accordance with the third embodiment is provided using the interaction between the wireless terminal 28, infomobile system 26 and integrated access platform (IAP) exchange system 10 in a very similar manner to the first embodiment which provides the Web content provision service using the digital telephone 14 as described above.

When the Web content provision service system, as shown in FIG. 1, starts to operate, the Web server 24 updates content information stored in its internal mass memory at step 400 in the same manner as the above step 100 of FIG. 2.

Figure 4:
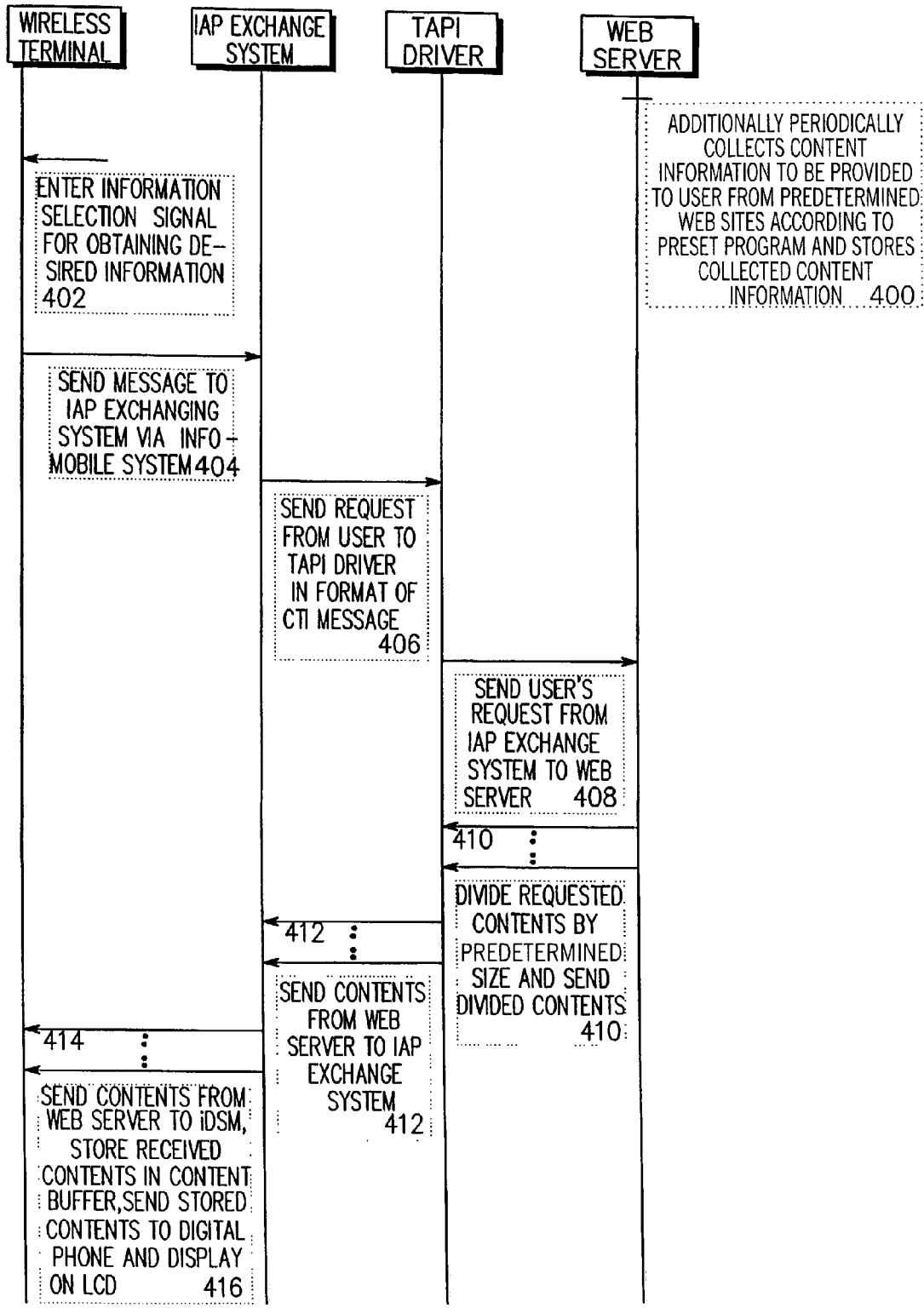
FIG. 4 is a sequence diagram illustrating a procedure of providing a Web content provision service using a wireless terminal of the exchange system, in accordance with the principles of a third embodiment of the present invention.

With reference to FIG. 4, a user of the wireless terminal 28 selectively enters to the wireless terminal 28 an information select signal such as a content request signal for requesting desired information, or desired content information using keys on a keyboard of the wireless terminal 28 at step 402 of FIG. 4. Then, at step 404, the wireless terminal 28 sends the entered content request signal to the infomobile system 26 according to the wireless application protocol (WAP) under the condition the user information mentioned in the first embodiment is contained in the entered content request signal. Upon receiving the content request signal from the wireless terminal 28, the infomobile system 26 subsequently sends the received content request signal to the digital trunk module (iDTM) 18 of the integrated access platform (IAP) exchange system 10.

Thereafter, if the digital trunk module (iDTM) 18 of the integrated access platform (IAP) exchange system 10 receives the content request signal, at step 406, a call processor, or the call control processor, of the IAP exchange system 10 analyzes the user information contained in the content request signal and, on the basis of the user information, recognizes which wireless phone has requested the desired content information among a number of wireless terminals. Further, at step 406, the call processor then converts the content request signal into a content transmission request message of a computer and telephony integration (CTI) message format and sends the converted content transmission request message through the local area network to the telephone application program interface (TAPI) driver 22 connected to the Internet protocol network.

If the sending of the content transmission request message to the telephone application program interface (TAPI) driver 22 is completed, the integrated access platform (IAP) exchange system 10, TAPI driver 22 and Web server 24 perform steps 208, 210 and 212 in FIG. 3, which steps are the same as the above steps 408, 410 and 412 in FIG. 4, and, as a result, content information according to the content transmission request message is sent to the LIP exchange system 10 in the form of a computer and telephony integration (CTI) message. Upon receiving the computer and telephony integration (CTI) message containing the content information from the Web server 24, the integrated access platform (IAP) exchange system 10 subsequently sends the content information to the infomobile system 26 together with the user information through the digital trunk module (iDTM) 18 at step 414.

Thereafter, if receiving the content information from the integrated access platform (IAP) exchange system 10, the infomobile system 26 analyzes the user information received together with the content information from the IAP exchange system 10 and wirelessly sends the received content information to the wireless terminal 28 corresponding to the user information at step 416. Upon receiving the content information from the infomobile system 26, the wireless terminal 28 displays the received content information on its liquid crystal display (LCD).

As described above, the third embodiment of the present invention allows the user of the wireless terminal 28 accommodated in the integrated access platform (IAP) exchange system 10 as an extension subscriber to be provided with customized Web contents by performing an interaction with the Web server 24. Therefore, the third embodiment has an advantage in that the user can more easily obtain information dealt with in a specific organization such as a company, from the Web server 24 connected to the integrated access platform (IAP) exchange system 10.

Although the above preferred embodiments of the present invention is described on the basis of an example where an integrated access platform (IAP) exchange system is used, a general private branch exchange (PBX) can be applied to the present invention. For example, in the case where a private branch exchange (PBX) is capable of performing voice over Internet protocol (VOIP) functions based on a local area network or Internet protocol, the PBX can be applied to the present invention under the condition that it includes a call processor for receiving and transmitting information about a user of an IP phone (such as hook on/off information of the Internet protocol phone, identifier, telephone number, Internet protocol information, various key select information and the like) through the local area network, and a database for storing information about a call control associated with the Internet protocol (IP) phone.

As apparent from the above description, according to the present invention, a user can be provided with desired Web contents using a digital telephone, an IP phone or a wireless terminal, which is registered in an IP-based private branch exchange (PBX) as an extension subscriber, thereby maximizing a utilization efficiency of those terminals which have been used as voice communications dedicated terminals. Further, using an extension wireless terminal, the user can be provided with the desired Web contents from a Web server connected to a private branch exchange (PBX) network, resulting in an increase in business efficiency.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. An apparatus providing a Web content provision service using at least one subscriber terminal of into an integrated access platform (IAP) exchange system, the apparatus comprising:
   at least one subscriber terminal for generating a content request information in response to a content request for receiving a content information in response to the generating of the content request information, and for displaying the received content information on a display, the content request information containing information identifying a user;
   a Web server for collecting the content information from at least one predetermined Web site at predetermined intervals of time for storing the collected content information, for accessing the stored content information in response to a first request message requesting transmission of the content information and for sending the accessed content information to said at least one subscriber terminal, the first request message corresponding to the content request information;
   integrated access platform (IAP) exchange system having identification information corresponding to said at least one subscriber terminal, having port information corresponding to the identification information, being connected to an Internet protocol network sending the first request message to said Web server over the Internet protocol network in response to the content request information received from said at least one subscriber terminal, receiving the accessed content information from said Web server, and sending the received content information to said at least one subscriber terminal; and
   a telephone application program interface (TAPI) driver connected to the Internet protocol network, for converting a content transmission request message provided from the into the integrated access platform (IAP) exchange system into a Web format, for sending the converted message to the Web server, and for sending content information to the into integrated access platform (IAP) exchange system, the content information provided from said Web server corresponding to the content transmission request message.

2. The apparatus as set forth in claim 1, said at least one subscriber terminal being an Internet protocol telephone including the display, being connected to the Internet protocol network, and being registered in said integrated access platform (IAP) exchange system as an extension subscriber.

3. The apparatus of claim 2, the information identifying the user including at least one selected from among a unique telephone number and a port number corresponding to said at least one subscriber terminal.

4. The apparatus of claim 1, wherein the telephone application program interface (TAPI) driver is connected to the Internet protocol network, converts a content transmission request message into an American National Standard Code for Information Interchange (ASCII) code message of a hypertext markup language (HTML) format, sends the converted ASCII code message to said Web server, converts content information, provided by said Web server in response to the content transmission request message, into a first computer and telephony integration (CTI) message, and sends the first into integrated access platform (IAP) exchange system CTI message to said.

5. The apparatus of claim 4, said into integrated access platform (IAP) exchange system converting the first CTI message into a second computer and telephony integration (CTI) message and sending the second CTI message to the telephone application program interface (TAPI) driver.

6. The apparatus of claim 5, said Web server accessing the content information from an internal storage area in response to the first request message, dividing the accessed content information by a predetermined size, and sending the divided content information to the telephone application program interface (TAPI) driver.

7. The apparatus of claim 1, said at least one subscriber terminal being a digital telephone connected to a digital subscriber module of said into integrated access platform (IAP) exchange system, and being registered in said into integrated access platform (IAP) exchange system as an extension subscriber, the digital telephone having the display.

8. The apparatus of claim 1, said integrated access platform (IAP) exchange system converting a content transmission message into a computer and telephony integration (CTI) message and sending the CTI message to the telephone application program interface (TAPI) driver.

9. The apparatus of claim 8, said Web server accessing the content information from an internal storage area in response to the first request message, dividing the accessed content information by a predetermined size A and sending the divided content information to the telephone application program interface driver.

10. An apparatus, comprising:
    at least one wireless terminal for generating content request information containing user information in response to a content request, for receiving a content information according to the content request information, and for displaying the received content information on a display;
    a Web server for collecting the content information from at least one predetermined World Wide Web site at intervals of a certain time for storing the collected content information, for accessing the stored content information in response to a first request message requesting to transmit the stored content information, and for sending the accessed content information to said at least one wireless terminal, the first request message being in response to the generated content request information;
    an into integrated access platform (IAP) exchange system having identification information corresponding to said at least one wireless terminal and having port information corresponding to the identification information, said being connected to an Internet protocol network, said into integrated access platform (IAP) exchange system sending the first request message to said Web server over the Internet protocol network in response to the content request information inputted through a trunk card, receiving the content information according to the content request information from the Web server, and outputting the received content information through the trunk card;
    a telephone application program interface (TAPI) driver connected to the Internet protocol network for converting a content transmission request message provided from the exchange system into a Web format, for sending the converted message to said Web server, and for sending content information to the into integrated access platform (IAP) exchange system, the content information provided from said Web server corresponding to the content transmission request message: and an infomobile system for establishing traffic channels between said at least one wireless terminal and a plurality of other wireless terminals, for receiving the content request information from said at least one wireless terminal, for sending the received content request information to said into integrated access platform (IAP) exchange system through the trunk card, for receiving the content information from said exchange system and for sending the received content information to said at least one wireless terminal.

11. The apparatus of claim 10, said at least one wireless terminal comprising at least one wireless telephone.

12. The apparatus of claim 10, the user information including at least one of a unique identification code used to identify said at least one wireless terminal and a telephone number.

13. The apparatus of claim 12, wherein the telephone application program interface (TAPI) driver is connected to the Internet protocol network, converts a content transmission request message into an American National Standard Code for Information Interchange (ASCII) code message of a hypertext markup language (HTML) format, sends the converted ASCII code message to said Web server, converts content information, provided by said Web server in response to the content transmission request message, into a first computer and telephony integration (CTI) message, and sends the first CTI message to said into integrated access platform (IAP) exchange system.

14. The apparatus of claim 13, said into integrated access platform (IAP) exchange system converting the first request message into a second computer and telephony integration (CTI) messages, and sending the second CTI message to said TAPI driver.

15. The apparatus of claim 14, said Web server accessing the content information from an internal storage area in response to the first request message, dividing the accessed content information by a predetermined size, and sending the divided content information to said TAPI driver.

16. The apparatus of claim 15, said at least one wireless terminal comprising at least one wireless telephone.

17. The apparatus of claim 10, said into integrated access platform (IAP) exchange system converting the first request message into a computer and telephony integration (CTI) message and sending the CTI message to said TAPI driver.

18. The apparatus of claim 10, said Web server accessing the content information from an internal storage area in response to the first request message, dividing the accessed content information by a predetermined size, and sending the divided content information to said TAPI driver.

19. A method of providing a Web content delivery service, comprising:
providing a Web content delivery service with at least one subscriber terminal of a Web content delivery service apparatus, the apparatus including at least one digital telephones an into integrated access platform (IAP) exchange system, a Web server and a telephone application program interface (TAPI) driver, at least one digital telephone being in communication with a subscriber module and generating content request information in response to a content request, the content request information containing user information including at least a port number of said at least one digital telephone, the into integrated access platform (IAP) exchange system being connected to an Internet protocol network, the into integrated access platform (IAP) exchange system providing a call control service to said at least one digital telephone using the user information such as port numbers for the digital telephone connected to a subscriber module, the Web server being connected to the into integrated access platform (IAP) exchange system the Web server sending the content information in response to a first request message requesting transmission of the content information, the first request message corresponding to the generated content request information, the TAPI driver being connected to the into integrated access platform (IAP) exchange system and to the Web server, the TAPI driver converting messages to be exchanged between the into integrated access platform (IAP) exchange system and the Web server, and the TAPI driver conveying the converted messages between the exchange system and the Web server;

the Web content delivery service comprising the steps of:
converting content request information from said at least one digital telephone into a converted content transmission message in a Web format. and sending the converted content transmission message to the Web server receiving the content information in response to the converted content transmission message;

receiving the content information through the TAPI driver; and sending the received content information to at least one digital telephone.

20. The method of claim 19, further comprising the steps of:
converting a content transmission request message into an ASCII code message in a telephone application program, and sending the ASCII code message to said Web server; and converting the content information into a computer and telephone integration (CTI) message, the content information being provided by the Web server in response to the content transmission request message, and sending the CTI message to the into integrated access platform (IAP) exchange system.

21. The method of claim 20, wherein the Web server accesses the content information from an internal storage area in response to the content transmission request message, divides the accessed content information by a predetermined size, and sends the divided content information to the TAPI driver.

* * * * *